(No Model.) 3 Sheets—Sheet 2.
A. M. ROUSE.
METHOD OF AND APPARATUS FOR SEPARATING SLIME OR FINES FROM WATER USED IN MILLING ORES.
No. 469,599. Patented Feb. 23, 1892.
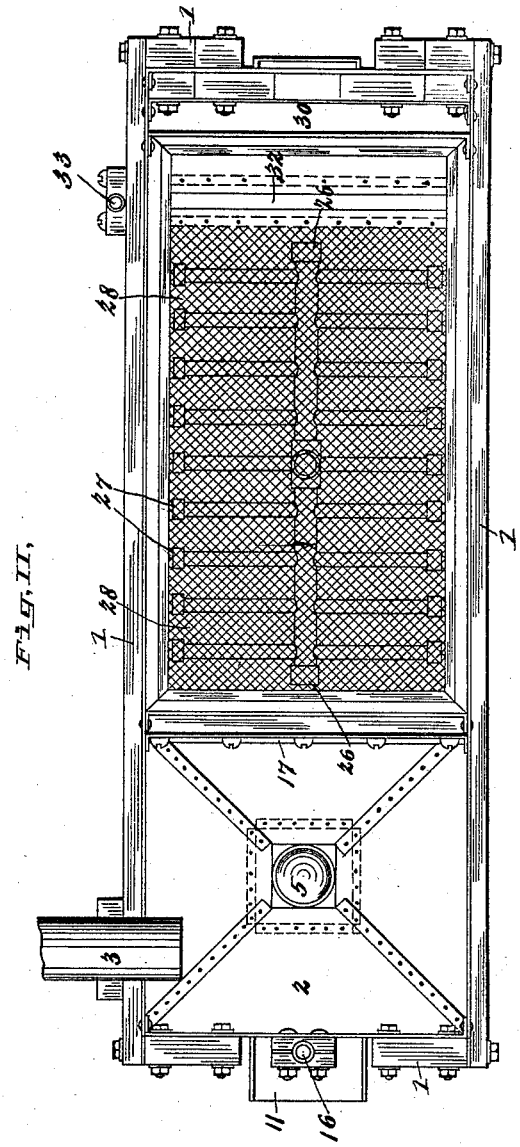
ATTEST
M. E. Durand
S. Cotton
INVENTOR
Albion M. Rouse
By Wright Bros
Attys (No Model.) 3 Sheets—Sheet 3.
A. M. ROUSE.
METHOD OF AND APPARATUS FOR SEPARATING SLIME OR FINES FROM WATER USED IN MILLING ORES.
No. 469,599. Patented Feb. 23, 1892.
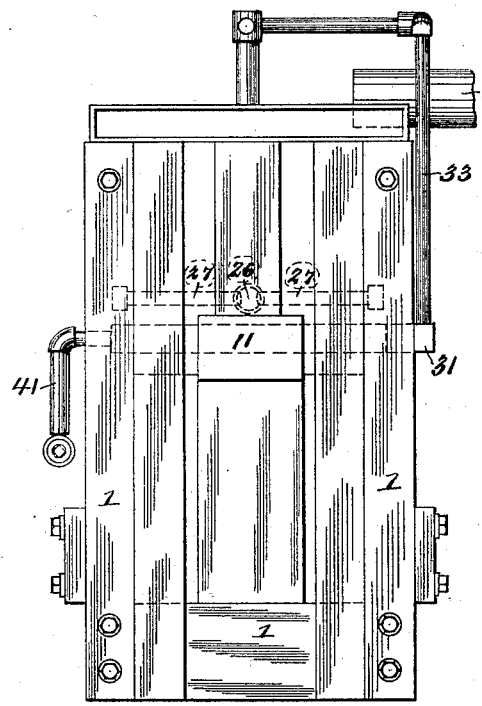
Fig. III.
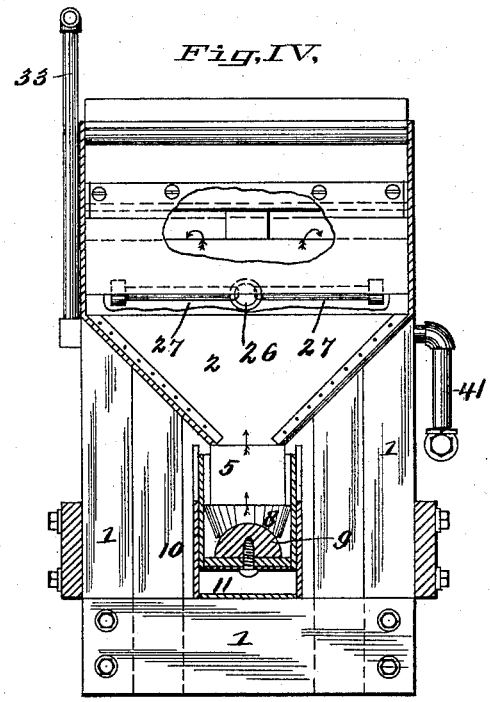
Fig. IV.
ATTEST
M. E. Durand
S. Cotton
INVENTOR
Albion M. Rouse
By Knight Bro's
Att'ys